United States Patent [19]

Beck et al.

[11] 4,066,380
[45] Jan. 3, 1978

[54] COMBINED BORING AND THREADING TOOL

[75] Inventors: Hans Werner Beck; Herbert Paul Jäger, both of Sinsheim, Germany

[73] Assignee: The Valeron Corporation, Oak Park, Mich.

[21] Appl. No.: 688,417

[22] Filed: May 20, 1976

[30] Foreign Application Priority Data

May 27, 1975 Germany ............................ 2523460

[51] Int. Cl.² ...................... B23B 5/46; B23B 29/034
[52] U.S. Cl. ................................... 408/125; 408/36; 408/42; 408/131; 408/173; 82/5; 90/11.54
[58] Field of Search ............... 408/158, 170, 173–178, 408/20, 22, 24, 25, 36, 117, 118; 90/11.5, 11.52, 11.54; 82/5

[56] References Cited

U.S. PATENT DOCUMENTS

| | | | |
|---|---|---|---|
| 2,054,028 | 9/1936 | Benninghoff et al. | 408/170 |
| 3,041,641 | 7/1962 | Hradek et al. | 408/158 |
| 3,621,754 | 11/1971 | Ditson | 90/11.54 |
| 3,884,590 | 5/1975 | Skrentner et al. | 408/158 |
| 3,902,386 | 9/1975 | Dressler et al. | 408/158 |

Primary Examiner—Leonidas Vlachos

[57] ABSTRACT

The invention relates to a threading tool for internal threads with a cutter holder which is displaceably mounted on a cutter holder carrier shaft co-axial to the main axis of the rotatable tool which coincides with the thread axis during the cutting process, whereby the said cutter holder shaft is moved forwards and backwards periodically with the forward feed corresponding to the thread pitch in the direction of the main axis in the thread chasing operation by a cam control with a camshaft co-axial to the cutter holder shaft and rotating with a differential speed relative thereto, whereby through a corresponding radial displacement of the cutter holder the cutter is raised during return travel and in the thread chasing operation is set to engage lower and lower from one thread chasing operation to the next up to the final cutting depth.

12 Claims, 12 Drawing Figures

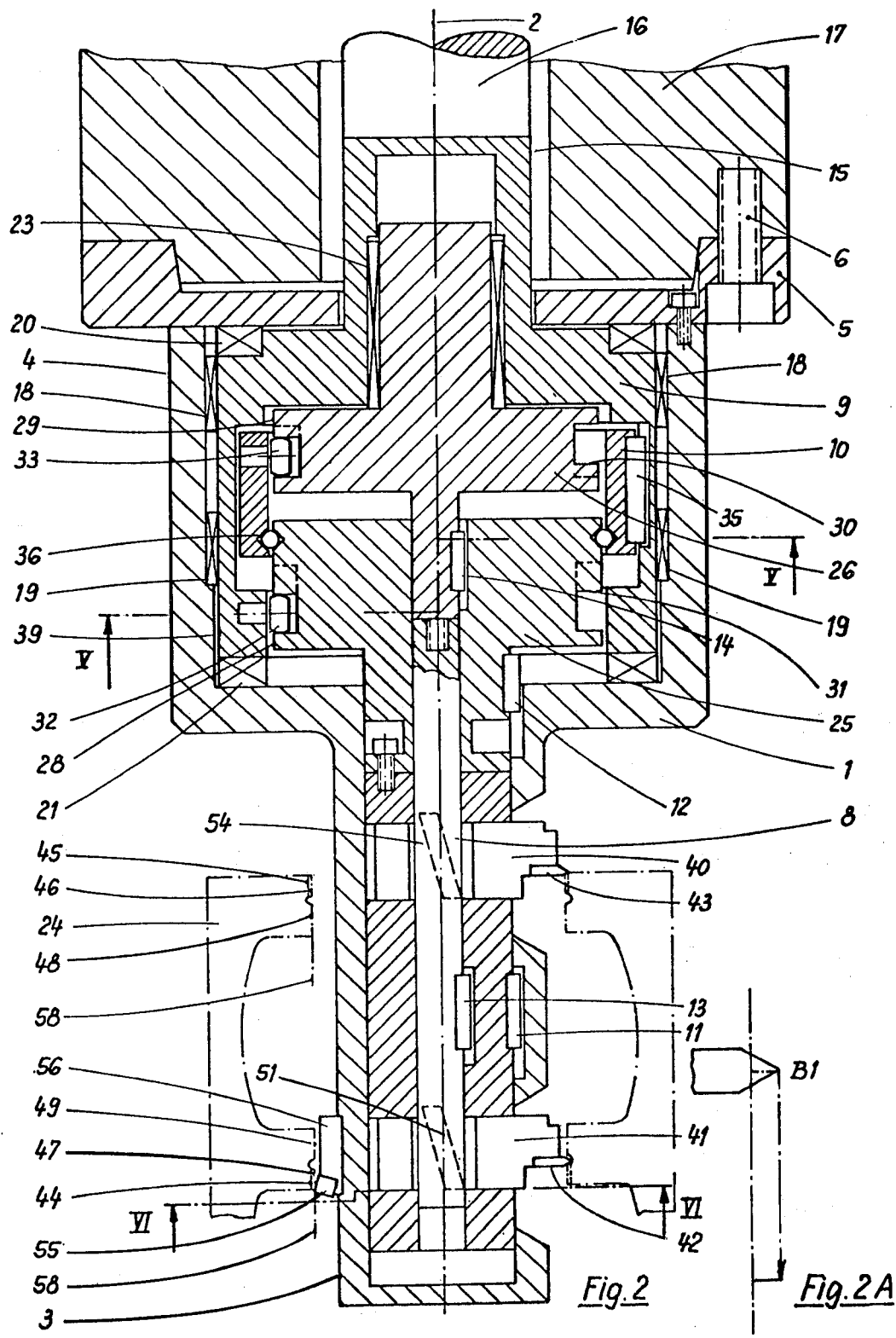

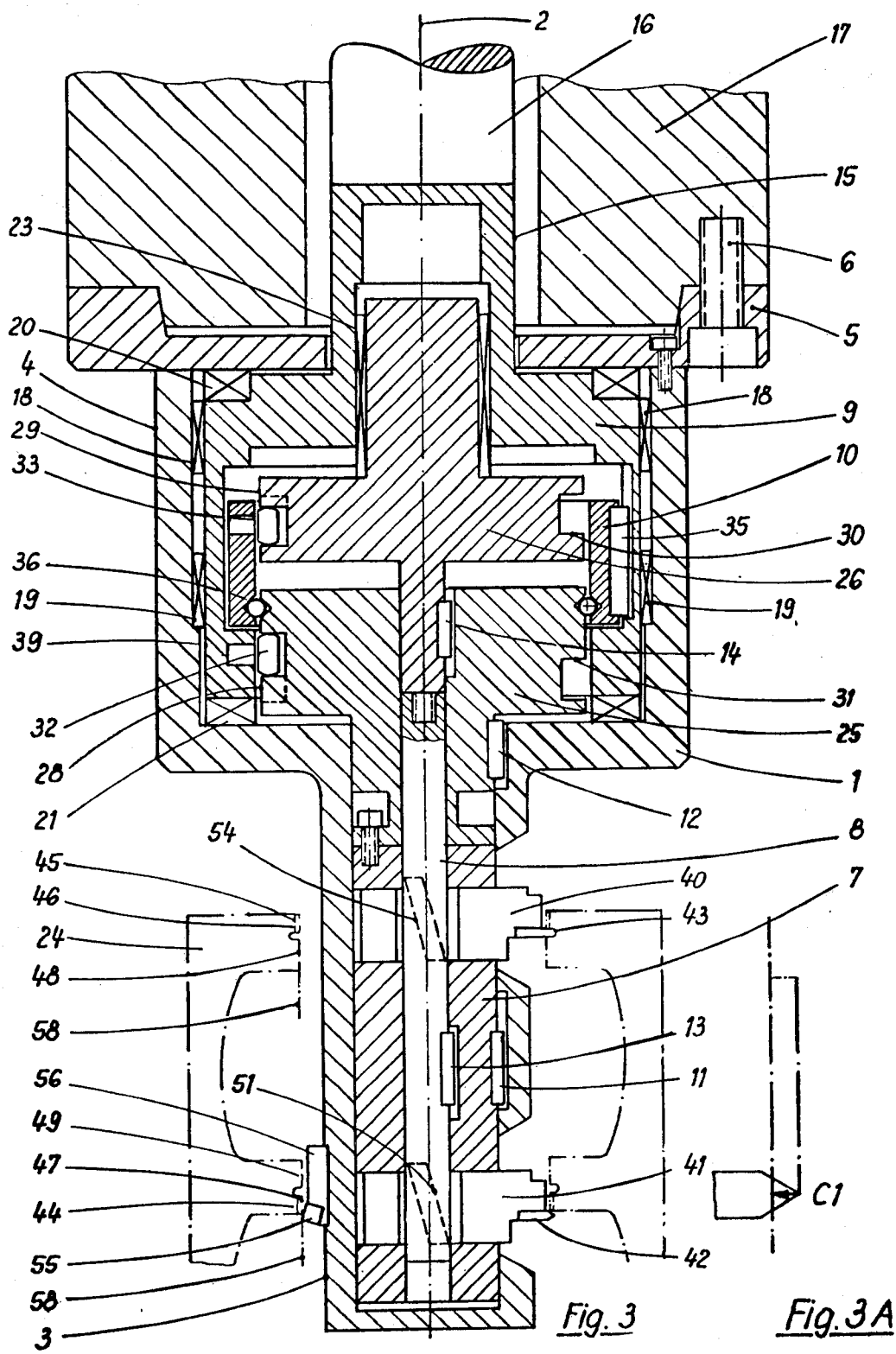

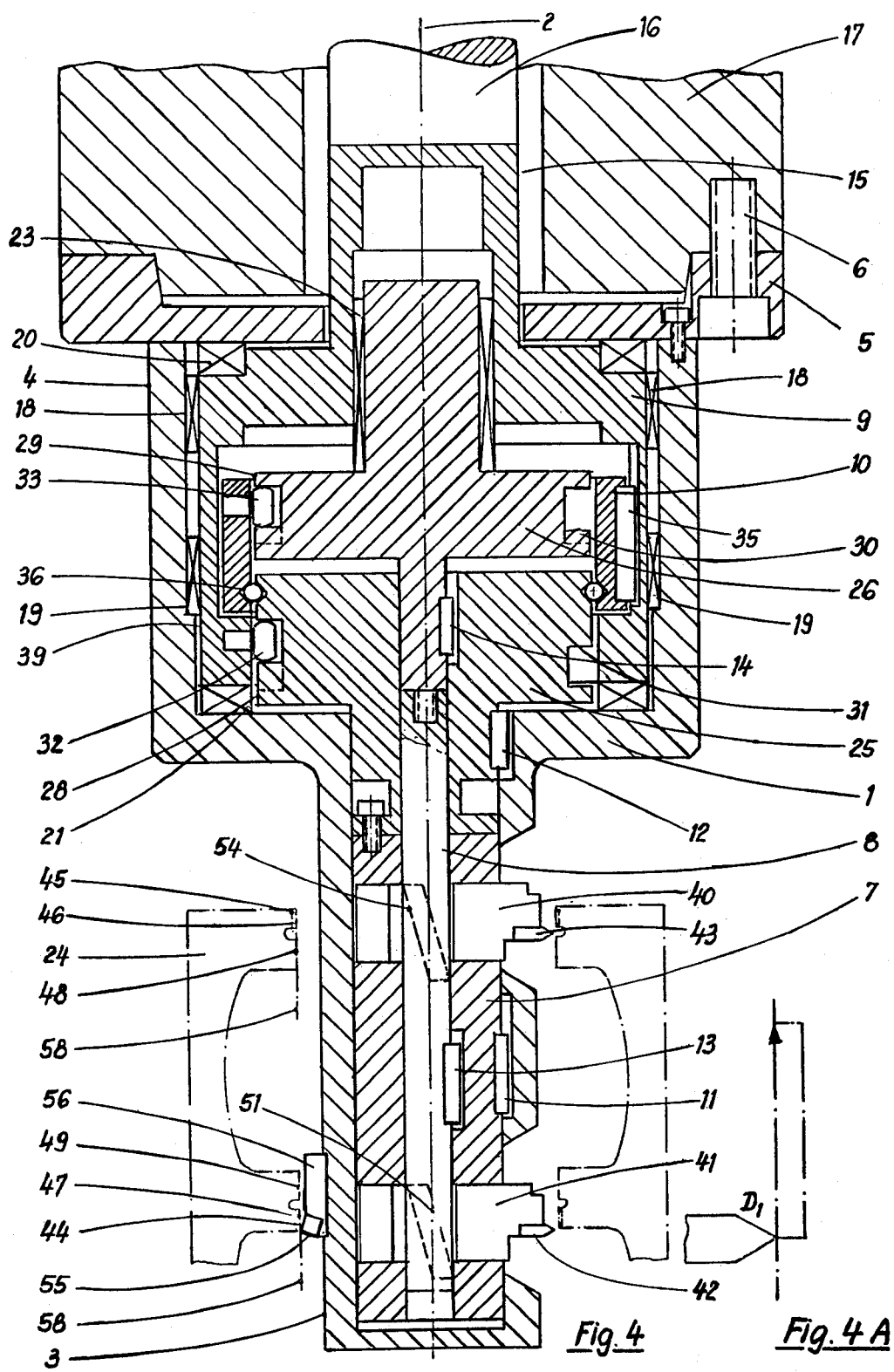

COMBINED BORING AND THREADING TOOL

BACKGROUND OF THE INVENTION

Threading tools of this type are preferably intended for transfer lines but are not restricted to this application.

In a tool of this type known from British Pat. No. 852,292 the cutter holder is mounted on the face of the cutter holder shaft remote from the drive so as to swivel about an axis at right angles to the main axis and can be swivelled to and fro about this swivel axis for raising during the return travel and for setting the cutting depth for the individual thread chasing operations. Suitable control means are not described in this Patent.

The problem of the present invention is to provide control means for a threading tool of the type described hereinbefore making it possible to adjust the penetration depth of the cutter in simple manner and with maximum freedom from play, as a function of the relative axial displacement of the cutter holder carrier shaft and a second axially displaceable member.

SUMMARY OF THE INVENTION

According to the invention this problem is solved in that for the radial displacement of the cutter holder, a slide coupled therewith via an inclined guide is provided which is mounted on the cutter holder carrier shaft in a torque transmitting manner and so as to be displaceable in the main axial direction and is moved backwards and forwards by means of a second cam control given by the cam actuating camshaft.

The use of two different cam controls makes it possible by corresponding dimensioning of the cam controls to match the two movements of the cutter, i.e., the axial and radial movements to one another in such a way as is necessary for the particular threading process involved. The coupling of the two cam controls via the common camshaft holds the cutter on the preset path. The cam control is driven by the circumferential speed difference of the cutter holder shaft on the one hand and the camshaft on the other. This speed difference can be set independently of the cutter holder shaft speed by a corresponding setting of the camshaft speed, so that the cutter movement program indicated by the two cam controls can also be performed at different cutter holder shaft speeds. Thus, the threading process can be performed more quickly or more slowly solely through setting the speed of the cutter holder shaft and the camshaft.

Advantageously the two cam controls have on a single cycle the complete program of a threading process with a plurality of thread chasing operations, whereby the cutting depth increases from one chasing operation to the next. Thus, the whole threading process comprising a plurality of thread chasing operations is controlled with a full cycle of the cam controls and the tool on completing one cutting process is again ready for the next.

In particular when the threading tool according to the invention is used in transfer lines, it is desirable and advantageous to compactly arrange all the control means in order to facilitate the installation of the threading tool. A corresponding further development is characterized in that of the two control members, the cam path and the guidance element guided along the latter of the first cam control, one is fixed to the cutter holder carrier shaft and the other to the camshaft and that of the two guidance members of the second cam control, one is fixed to the slide and the other to an intermediate member which is mounted in a torque transmitting manner on the camshaft and is displaceable in the main axial direction, being additionally mounted in rotary manner on the cutter holder shaft and in non-displaceable manner in the main axial direction. In this further development it is advantageous that the guidance members of both cam controls can be closely juxtaposed, making it only necessary to traverse short distances to couple the two cam controls which contributes to freedom from play. This construction of the invention also makes it possible to make the front portion of the casing slender, so that the said portion can be inserted into relatively narrow tapholes. However, the tool is driven exclusively from the rear end which facilitates the arrangement and manipulation of the tool.

In order to cut an internal thread the prepared taphole must be axially aligned relative to the threading tool and have a specific diameter. This is ensured in simple manner according to a further development which is characterized in that on the periphery of the rotatable body or housing portion remote from the drive end a boring tool holder for a boring tool is provided adjustable to the taphole of the associated cutter holder and adjacent bored holes of equal diameter co-axial thereto. According to this further development the threading tool initially turns the prepared taphole by means of the boring tool and as this necessarily takes place co-axially to the main axis and with the radius settable on the boring tool, the prepared taphole can be easily finished in this way, so that it has precisely the correct co-axial alignment and the exact diameter for the following cutting process, which is performed whilst maintaining the axial alignment of the threading tool. Correspondingly, bored holes extending co-axially to the thread can be finished very simple and with maximum precision with regard to the fit.

DESCRIPTION OF THE DRAWINGS

The invention is now explained in exemplified manner relative to the attached drawings, wherein show:

FIGS. 1 to 4 in longitudinal section an embodiment of the invention in different operating positions, whereby FIGS. 1A to 4A in each case show the cutter path diagram but not all parts are cut;

DETAILED DESCRIPTION OF THE INVENTION

Figures 1, 1A:
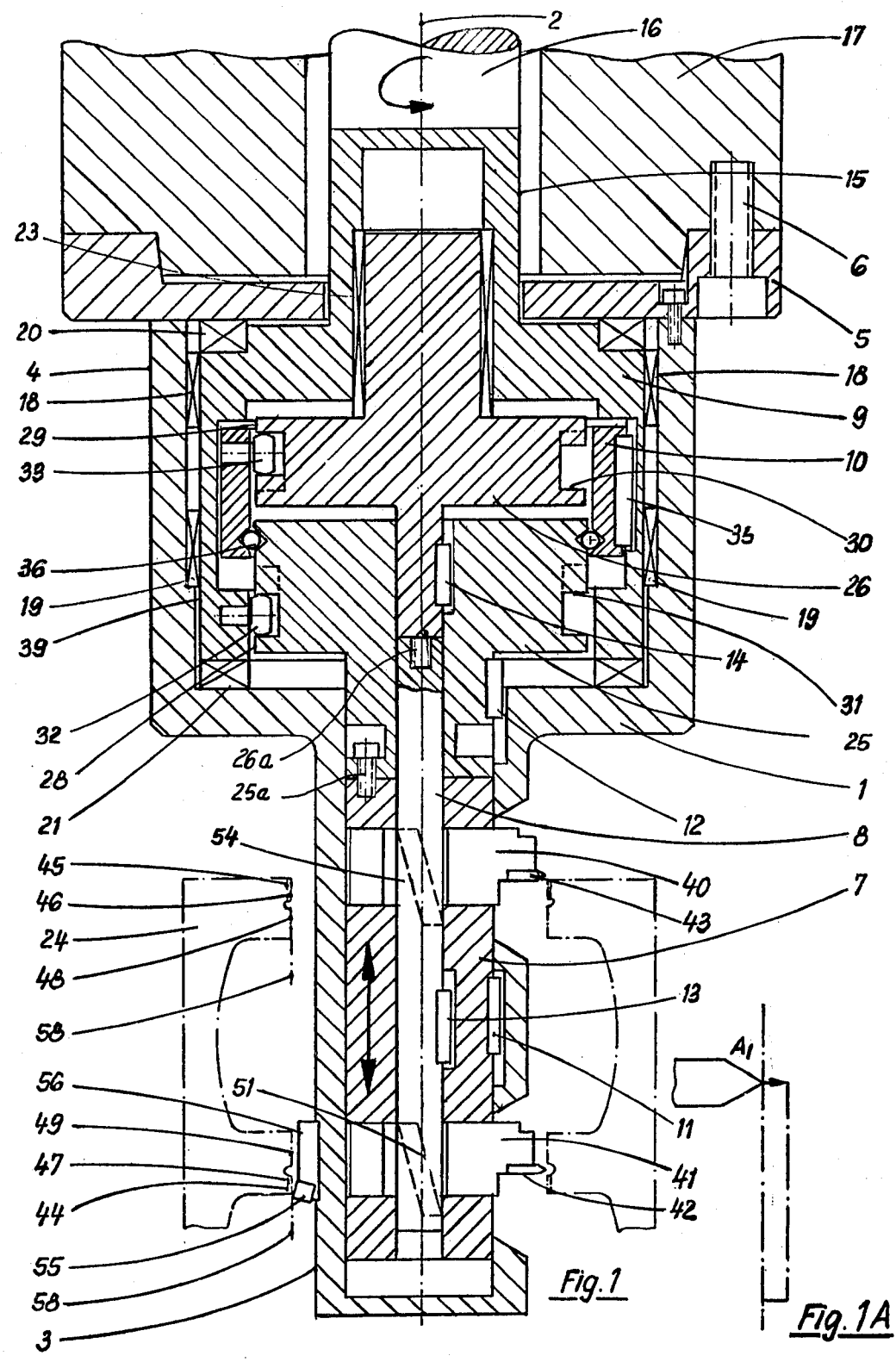
Figure 5:
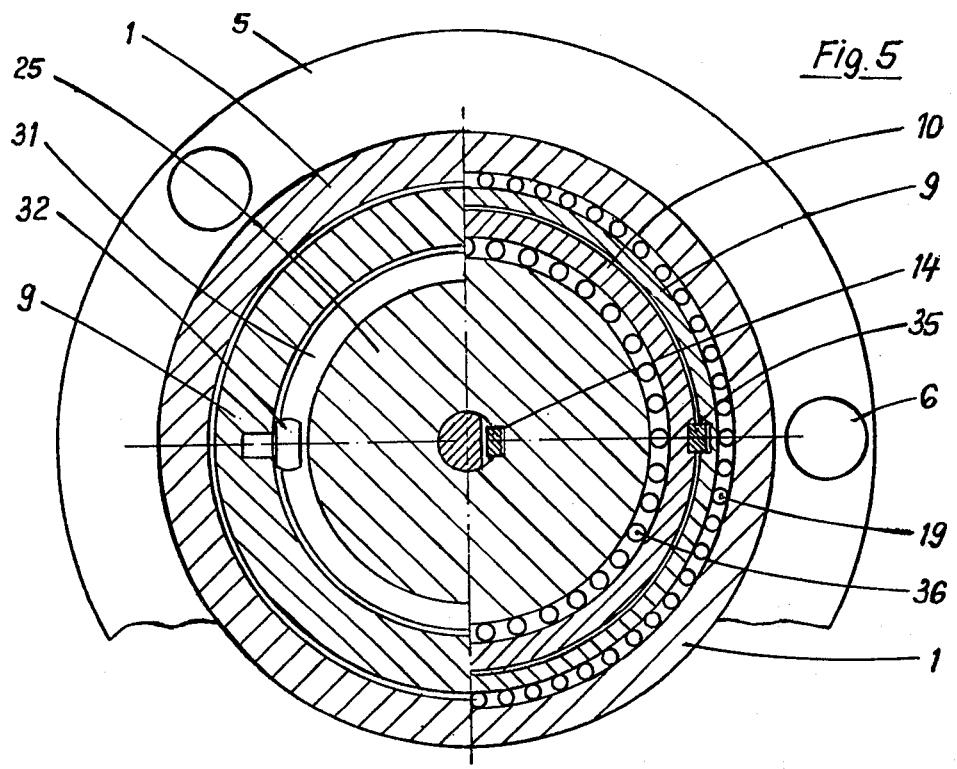
FIG. 5 — the section V—V of FIG. 2.
Figure 6:
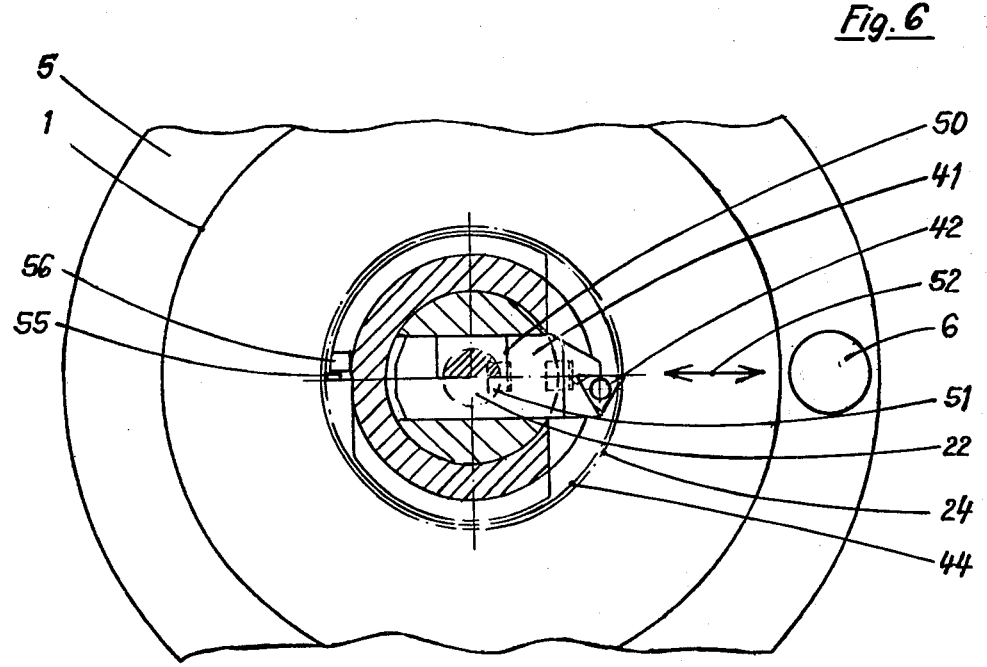
FIG. 6 — the section VI—VI of FIG. 2.

In the drawings 1 generally designates a rotatable body casing which is substantially co-axial to the main axis 2 and which comprises a front small diameter portion 3 remote from the drive, a large diameter portion 4 on the driving-side and a rear flanged wheel 5. Casing 1 is connected by bolts 6 to a hollow shaft 17, rotated at a first speed, for example, 208 revolutions per minute. The cutter holder carrier shaft 7, slide 8, cam actuating camshaft 9 and intermediate member 10 are mounted co-axially to the main axis within casing 1. The cutter holder shaft 7 is driven with casing 1, via keys 11, 12 so that it must rotate with the casing, but is displaceable in the direction of the main axis 2 within the said casing. Slide 8 is driven with the cutter holder shaft 7, via keys 13, 14 so that it must rotate with the cutter holder shaft but is displaceable in the direction of main axis 2 relative to the said cutter holder shaft. On its rear driving end 15, cam shaft 9 passes out of casing 1 and is connected to a second drive shaft 16, co-axial to hollow shaft 17 and which is rotated at a second speed in the same rotation direction as for casing 1, for example, 206 revolutions per minute. Camshaft 9 is mounted in needle bearings 18, 19 in rotary manner relative to casing 1 but in axially non-displaceable manner within said casing 1 by axial roller bearings 20, 21. Reference numeral 23 designates a bearing wherein is mounted, in rotary manner relative to the camshaft, the rear end of slide 8 which is also displaceable in the main axial direction relative to the camshaft. Cam actuated disc 25 is connected in a torque transmitting manner to the driving end of cutter holder shaft 7 by bolts 25a, and cam actuated disc 26 is connected in a torque transmitting manner with the driving end of slide 8 by a threaded axial connection 26a. The two cam discs 25, 26 have the same diameter and on their periphery 28, 29 have in each case a cam path 30, 31 in the form of a closed slot. A cam follower 32 fixed to camshaft 9 engages in cam path 31 and a cam follower 33 fixed to guidance member 10 engages in cam path 30. The two cam followers 32, 33 fit with a very small amount of play in the appropriate cam paths 30, 31 biased in the main axial direction. Guidance member 10 is mounted in a torque transmitting manner by means of a key 35 on camshaft 9, but is displaceable in the main axial direction relative to the latter. Guidance member 10, which is constructed as a ring co-axial to the main axis 2, overlaps by a small amount periphery 28 and is mounted in rotary manner on cutter holder shaft 7, but is not displaceable in the main axial direction, by means of ball bearings 36. The end 39 of camshaft 9 remote from the drive is cup-shaped and embraces the two cam discs 25, 26 and the intermediate member 10 rotated therebetween.

Two cutter holders 40, 41 are displaceably mounted radially to main axis 2 at the end of the casing remote from the drive and are guided in cutter holder shaft 7. A cutter 42, 43 is interchangeably and adjustably fixed to each of the cutter holders 40, 41 and serves to cut an internal thread 44 and/or 45. Co-axial tapholes 46, 47 are prepared in workpiece 24 for the two internal threads 44, 45, which are co-axial to main axis 2 and which are, for example, of the same size. Workpiece 24 is held in co-axial alignment to the tool, as shown in the drawings (holding means omitted). Slide 8 is passed through an opening 50 in cutter holder 41 and has a guidance comb 51 which is in inclined to main axis 2 and is recessed in positive locked manner in opening 50. The recess for guidance comb 51 is designated by reference numeral 22. If slide 8 moves in the direction of main axis 2 then the inclined guidance comb 51 drives the cutter holder in the appropriate direction of double arrow 52, i.e., radially to the main axis 2. Thus, the radial position of cutter holder 41 and consequently the penetration depth of cutter 42 is determined by the axial setting of slide 8 relative to cutter holder shaft 7. Cutter holder 40 is constructed and mounted in exactly the same way and is radially adjusted by an inclined guidance comb 54 in precisely the same way as cutter holder 41. The end of the casing remote from the drive has openings for both cutter holders 40, 41, so that the latter can project from the casing periphery.

A boring toolholder 56 is provided on the periphery on the end 3 of casing 1 remote from the drive by means of which a boring tool 55 is supported, so that its cutting depth indicated by dotted line 58 corresponds to the internal diameter of the tapholes 46, 47 prepared for the threading process.

Figure 7:
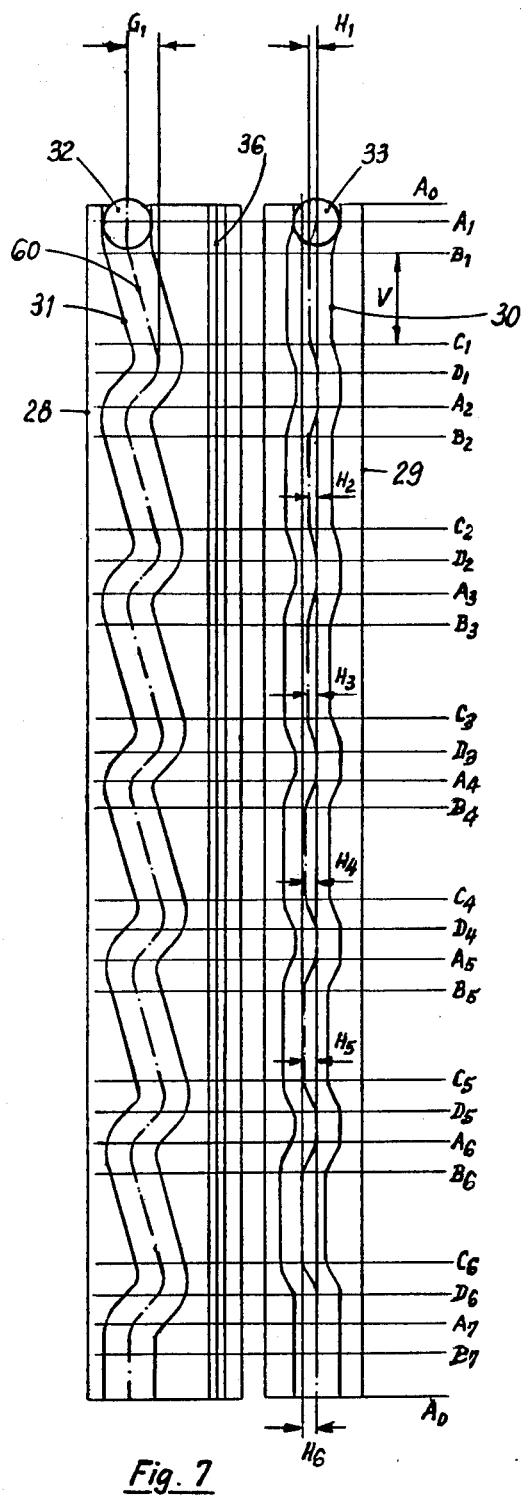
FIG. 7 — the development of the cam paths of the two control cams of FIGS. 1 to 4.

The development of cam path 31 and cam path 30 is shown in FIG. 7 which shows the complete periphery 28, 29. A complete threading program is provided on the periphery of the two cam discs, which consists of six thread chasing operations which follow one another with an increasing penetration depth. During operation the first speed with which casing 1 rotates is faster than the second speed with which the camshaft 9 rotates, so that the latter, during the complete threading process lasting, for example, half a minute and comprising six thread chasing operations, rotates once less than casing 1. In the meantime the two cam followers 32 and 33 have passed once through the appropriate cam path 31 or 30.

Figure 8:
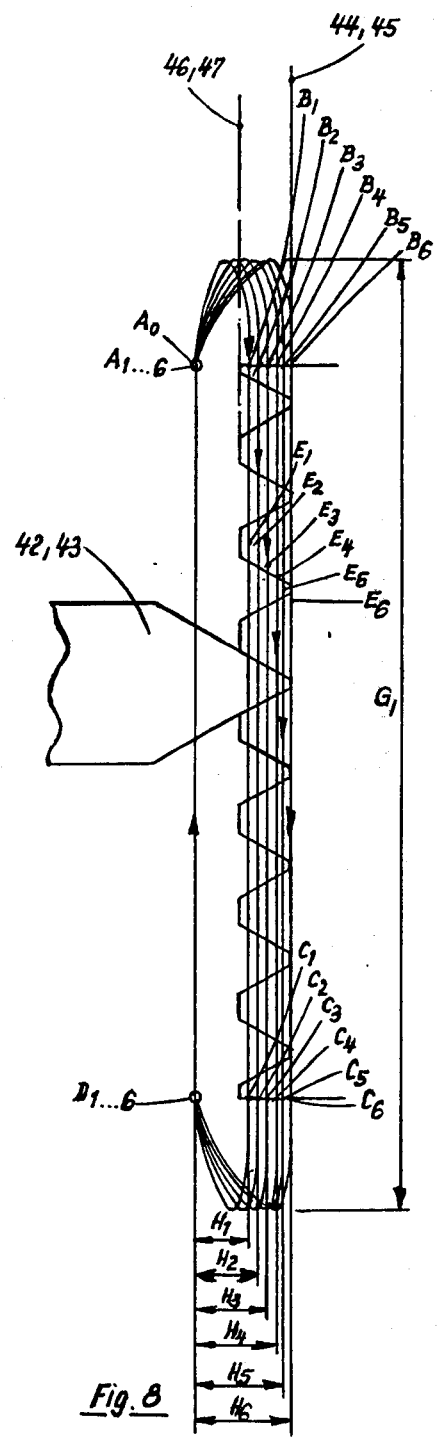
FIG. 8 — the cutter path shown in FIGS. 1A to 4A for an exact and complete threading process comprising a plurality of thread chasing operations.

The cutter is controlled in the following manner. Starting from position A1 of the parts, shown in FIG. 1, the two cutters are in the main axial direction and are radially drawn back from the appropriate threads 44 and 45. On the way from position A1 to position B1, cam path 31 has performed a first feed stroke H1, on the basis of which slide 8 is moved and consequently the two cutter holders 40 and 41 are somewhat radially extended. On the way from position B1 to position C1, cam follower 32 passes through a first rising branch 60 of cam path 31, so that cutter holder shaft 7 and consequently slide 8, experience a cutting stroke G1 in the direction of main axis 2. The cutters thereby perform a first chasing operation on path E1 in FIG. 8 until the parts assume the position C1. On the way from position C1 to position D1, slide 8 is again moved back from cutter holder shaft 7 and consequently the cutter is radially retracted, so that it is disengaged from the cut thread and then cutter holder shaft 7, together with slide 8 are drawn back into position A2. This is the starting position for the second thread chasing operation, which extends from positions A2 to position A3. During the second chasing operation the cutter covers path E2 in FIG. 8, which takes place with a larger feed stroke H2 than in the case of path E1. There are no other differences in the control of the second chasing operation. The next four chasing operations are preformed on paths E3 to E6 with, in each case, an increasing feed stroke H3 to H6, i.e., an increasing penetration depth of the cutter and with the second chasing operation which takes place on path E6 with the maximum feed stroke H6, the threading process is terminated. The rotary drive for camshaft 9 (not shown) is then disengaged in position A0, wherein the two cam followers 32, 33 are located in the portion of cam paths 30, 31 located between B7 and A1. Camshaft 9 is now frictionally rotated synchronously by the still rotating casing 1.

If boring tool 55 for the next workpiece is now to be used for hollowing out by turning a taphole, this performed in the retracted inoperative position of the cutters, i.e., in position A0. In this position the tool with all its component parts is driven so as to rotate about the main axis at the same circumferential speed and, based on FIGS. 1 to 4, is introduced from top to bottom into a co-axially prepared taphole which is then turned to the exact size by boring tool 55 which is running ahead of the cutters. Due to the fact that they remain in the retracted position A0, cutters 42, 43 are inoperative during this turning process. The finished cut on bored holes 48 and 49 is performed in corresponding manner.

We claim:

1. A threading tool comprising a rotatable body, a cutter holder carrier mounted with means for axially displaceable conjoint rotation with said rotatable body, a cutter holder mounted with means for radial displacement on said carrier, first cam actuated means for producing axial displacement of said carrier relative to said body, second cam actuated means for producing radial displacement of said cutter holder relative to said carrier, cam actuating means adapted to actuate said first and second cam actuated means, and interengaging cam means between said cam actuated and cam actuating means formed to provide sequential radial displacement of said cutter holder preparatory to a thread chasing operation followed by axial displacement of said carrier at a rate per revolution based on the required thread pitch during rotation of said body.

2. A threading tool as set forth in claim 1 wherein said interengaging cam means is formed to provide radial and axial retraction respectively of said cutter holder and carrier at the end of a thread chasing operation.

3. A threading tool as set forth in claim 2 wherein said interengaging cam means is formed to provide multiple cycles of thread chasing at progressively greater radial depth of cut.

4. A threading tool as set forth in claim 2 wherein said cam actuating means comprises a rotatable element mounted relative to said body for driven rotation at a differential rate.

5. A threading tool as set forth in claim 4 wherein said differential rate is adapted to complete one threading operation to required depth of thread during one cycle of relative revolution between said body and said cam actuating means.

6. A threading tool as set forth in claim 5 wherein said interengaging cam means is formed to provide multiple cycles of thread chasing at progressively greater depths during one complete relative revolution of said rotatable body and said cam actuating means.

7. A threading tool as set forth in claim 1 wherein said cam actuating means is axially fixed relative to said rotary body.

8. A threading tool as set forth in claim 4 wherein said cam actuating means in axially fixed relative to said rotatable body, said interengaging cam means including an annular cam track for each of said first and second cam actuated means and a reactive cam follower adapted to effect relative axial displacement between said carrier and said cam actuating means and to effect coordinated relative axial displacement between said first and second actuated cam means during rotation of said body and differential rotation of said cam actuating means.

9. A threading tool as set forth in claim 1 including a cutting element mounted in fixed relation on said rotatable body adapted to machine a cylindrical surface upon axial feed of the rotatable body relative to its axially fixed threading position.

10. A threading tool as set forth in claim 1 including multiple cutter holders mounted on a common carrier.

11. A threading tool as set forth in claim 1 including means to produce radial movement of said cutter holder in response to axial movement of said second cam actuated means.

12. A threading tool as set forth in claim 1 including means for mounting said cam actuating means in axially fixed and differentially rotatable relation to said rotatable body, wherein said first and second cam actuated means include annular portions respectively axially displaceable relative to said cam actuating means, and wherein said interengaging cam means includes interengaging annular cam track and cam follower means adapted to produce coordinated axial movement of said respective portions responsive to relative differential rotative movement between said cam actuating means and said respective portions.

* * * * *